3,000,566
ECONOMIC DISPATCH COMPUTER FOR ELECTRIC INTERMESHED POWER DISTRIBUTION SYSTEMS

Hans Edelmann, Erlangen, Germany, assignor to Siemens-Schuckertwerke Aktiengesellschaft, Berlin-Siemensstadt and Erlangen, Germany, a corporation of Germany
Filed May 7, 1958, Ser. No. 734,086
Claims priority, application Germany May 8, 1957
15 Claims. (Cl. 235—185)

My invention relates to an analog computer for assigning loads to electric power generating stations in interlinked power distribution systems.

In such systems, representing a complex large-area network in which the power demand of the consumers is supplied from a number of cooperating power stations, the power to be generated by the individual stations is assigned thereto by a load dispatcher. For this purpose, the power generating cost peculiar to the different stations must be considered in order to meet the power demand in the most economical manner. These cost data must be available in the form of production cost curves for each of the stations. The curves for each station indicate the incremental amounts of active power furnished by the station versus the generating cost per hour. This ratio may be represented, for example, in dollars per hour.

In the past, the load dispatcher assigned the respective contributions to the various power stations from the viewpoint of keeping the cost per megawatt hour of generated power approximately the same for all contributing stations. This corresponds to the requirement that each power station operate in accordance with a production cost curve that exhibits approximately the same rate of change for all stations. Such a method of distributing loads, however, does not secure most economical operation of the power stations because it fails to take into account the transmission losses occurring in the network. The transmission losses greatly modify the results obtainable only from considering minimum generating cost; and the consequent departures from the economical optimum may involve considerable financial losses per year in complex power networks of medium and large size. This will be realized if one considers that, from the principle of lowest transmission losses, it may be uneconomical to have a power station of low generating cost feed a consumer at a remote location because of the high transmission losses involved. On the other hand, it may also be uneconomical to feed nearby consumers from power stations of high generating cost.

In the past practice, a proper consideration of transmission losses by the load dispatcher was infeasible due to the complexities of the transmission problems involved. Among these problems, for example, is the question which influence the power transmitted from one network group of power stations through a second such network to a third network may impose upon the power stations in the intermediate network as regards their proper respective contributions within their own network. That is, when power is supplied from a station group A to a group B, and if this amount of power passes through a third group C, then this passage of power will superimpose itself upon the loading within the distribution network of the station group C and will influence the optimum of the internal operation of all power stations appertaining to the network group C.

If a group comprises not only steam stations for which an accurate incremental production cost curve can be set up, but also hydro stations, then there is the further problem that each quantity of water in the hydro station must be correlated to a corresponding fuel quantity in the steam stations, so that the cost of coal or other fuel must be determined as an equivalent of quantities of water. This correlation of cost to a given quantity of water must be made under consideration of the loading situation and the water supply conditions. The over-all production cost curve therefore depends upon the contribution of all associated power stations, upon the load distribution in the interlinked systems, and upon the required total power demand of all consumers.

The main difficulty of assigning the power loading to the stations of an intermeshed distribution network from sufficiently accurate economical viewpoints thus resided in the fact that there was no reliable method of assigning to the individual power station its proper share of the total transmission losses of the interlinked over-all system.

In the recent past, certain calculating methods have become known which afford determining the share of the network transmission losses assignable to the respective power stations; and this has made it possible to design an economic dispatch computer which automatically determines the contribution of each station based upon the generating cost of that particular station as well as upon the share of that station in the transmission losses within the over-all system. In this respect, reference may be had to the following papers by Helmut Bauer (in the German language):

(1) "Optimaler Verbundbetrieb," published in "Archiv für Elektrotechnik," Volume 42, 1955, No. 1, pages 13 to 25 (which explains the mathematical derivation of the optimizing equation presented below);

(2) "Verbundbetrieb mit geringsten Verlustkosten," published in "Elektrotrechnische Zeitschrift" (ETZ), Volume 76, 1955, No. A11, pages 389 to 391 (which explains the mathematical derivation of the loss formula presented below);

(3) "Die Ermittlung der Verluste in Drehstromnetzen und das Optimierungsproblem des Lastverteilers," published in "Elektrizitätswirtschaft," Volume 55, 1956, No. 7, pages 180 to 183; and (4) "Günstigste Lastverteilung und Verluste in Drehstromnetzen," published in "Elektrizitätswirtschaft," Volume 55, 1956, No. 17, pages 600 to 605 (containing a brief description of the above-mentioned known economic dispatch computer).

An economic dispatch computer of the mentioned known type can automatically control the contribution of the cooperating station units of a distribution network for supplying a given total load, so that the generating cost in dollars per hour, required for the total load and including the transmission losses, is a minimum. For realizing this condition, the computer operates by solving a group of simultaneous economic dispatch equations for the system. These "optimizing equations" include a formula for the transmission losses in the system network. The optimizing equations have the form:

$$\frac{\partial K_i}{\partial N_i} + \lambda \left[ 2 \sum_{k=1}^{n} B_{ik} \cdot N_k + B_{io} \right] = \lambda \qquad (1)$$

and the loss formula has the form:

$$N_v = \sum_{i=1}^{n} \sum_{k=1}^{n} B_{ik} N_i N_k + \sum_{i=1}^{n} B_{io} N_i + B_{oo} \qquad (2)$$

wherein:

$N_i$, $N_k$ denote the active power fed into an analog network (substitute or model network) of the computer from the $i$-th and $k$-th power stations respectively;

$B_{ik}$ is a loss factor of the dimension $1/W$ (watt) derived with the aid of a transforming method which translates the original intermeshed network (having a number of feeder points and loads) into a substitute network with a single hypothetical load and hence a single hypothetical load current (as is further explained below);

$B_{i0}$ is a dimensionless factor indicating the electrogeographic distribution of the power stations relative to the differential changes of the no-load network losses occurring when the feed from the power station changes;

$B_{00}$ denotes the no-load active loss of the network, this term having the dimension W (watt);

$$\frac{\partial K_i}{\partial N_i}$$

denotes the differential (incremental) fuel cost of the $i$-th power station, this cost value being obtained by differentiating the cost curves $K_i = f(N_i)$ of the particular power station ($K_i$ denotes the generating cost per hour);

$\lambda$ denotes the incremental cost of delivered power. This term is a specific cost factor, also called differential cost factor, for calculating the incremental network losses $$\frac{\partial N_v}{\partial N_i}$$

as cost of transmission loss per power station. $N_v$ denotes the total power losses of the over-all system network; the incremental network losses $$\frac{\partial N_v}{\partial N_i}$$

$$\left[ 2 \sum_{k=1}^{n} B_{ik} N_k + B_{i0} \right]$$

The above-presented loss Formula 2 as such represents only the first three members of a Taylor-series relative to the variable values of $N_r$. The members of a higher power than 3 are neglected for simplicity. The ideal loss curve according to the Formula 2 is represented by a paraboloid in the $n+1$ dimensional space; and if the value $B_{ik}$ changes, the curve is represented by a family of different paraboloids.

The loss Formula 2 is predicated upon the assumption that, in the load range under observation, the load currents, including the component feeder currents, vary only proportionally. By varying the $B_{ik}$ values, which is effected by the switching of corresponding resistors in the analog computing device, this value is adapted to the particular load condition.

The optimizing Equation 1 is obviously satisfied if, as the loss formula indicates, only the active power values $N_i$, $N_k$ fed into the network by the power stations are taken into account for covering the power demand and the transmission losses. Only active power values cause fuel cost in the power stations. The products of the active power values $N_i \cdot N_k$ enter into the loss Formula 2 together with the coefficient $B_{ik}$. They are dependent upon the particular load condition. Consequently for several possible load conditions, several corresponding loss formulas are to be set up.

However, of all conceivable load conditions, the known computing device such as described in the above-mentioned publication 4, can take into account only a given number, namely those which fall into the so-called characteristic load range. This is because the operation of the computer is based upon a quadratic loss formula. The characteristic load range corresponds to a loading of the network of approximately 70 to 80%, such loading being most frequently encountered in practice.

Within this limitation, the known economic dispatch computer satisfies the optimizing Equation 1 in such a manner that the sum power controlled by the computer through the load dispatcher, for example the sum $N_1 + N_2$ relating to two feeder stations, is produced at the lowest cost if the incremental cost factor $\lambda$ is the same for the respective contributing stations.

Accordingly, the above-mentioned known dispatch computer comprises for each of the respective power station units an analog computing mechanism which furnishes an electric current or voltage whose quantity is indicative of the rate of production (fuel) cost $$\frac{\partial K_i}{\partial N_i}$$

in dependence upon the adjusted increment of delivered active power $N_i$. Correlated to these analog computing mechanisms are respective, additively acting electric circuits of multiplying members in which the incremental cost of the system transmission losses for the particular power station is calculated from the given system network conditions ($B_{ik}$) and from the incremental cost factor $\lambda$ of the consumers, the latter factor being dependent upon the total system load. The resulting output magnitude is supplied in the computer to a comparing device which compares this output magnitude with the rate of production (fuel) cost $$\frac{\partial K_i}{\partial N_i}$$

and which, in dependence upon the differential result of the comparison, causes the correlated computing mechanism to vary the adjusted increment of delivered power in the sense required to make the differential value equal to zero. This adjustment has the effect of determining the economically most favorable power delivery for each power station for the particular cost factor $\lambda$ given by the total system loading.

Although the optimizing control of interlinked station operation with the aid of the above-mentioned known economic dispatch computer is automatic, the determination of the $B_{ik}$ values, which, as mentioned, are built into the computing apparatus in form of controllable resistors, requires a considerable amount of calculating work before these values can be put into the dispatch computer. When using desk-type calculating machines, the figuring of these values may require several weeks of preliminary calculating work. The use of digital calculating machines also requires comprehensive measurements before such auxiliary machines can be used.

Although, in the event of load changes in the distribution system, the $B_{ik}$ values can still be varied in the computer equipment by the switching of the above-mentioned resistors, the dispatch computer, in practice, is operated with a loss formula in which the loss coefficients are fixed values. This requires providing a multiplicity of different loss formulas, and even then there may be cases, such as unforeseen drop-outs in the system network, or load conditions greatly departing from the characteristic load range, which can no longer be taken into account by the dispatch computer. As a result, the incremental share of the transmission losses $$\frac{\partial N_v}{\partial N_i}$$

is no longer accurately simulated so that the economic optimum of interlinked network operation is no longer attained.

It is an object of my invention to provide an economic dispatch computer for interlinked power distribution systems that, while based upon the above-explained principles of the known analog dispatch computer and the previously employed concept of a hypothetical load current, eliminates the shortcomings heretofore caused by the necessity of preliminarily calculating the various loss factor values $B_{ik}$.

A more specific object is to devise a computer of the above-mentioned type which fully eliminates the necessity of measuring the loss factor ($B_{ik}$) values, or computing them, or putting them into the computer apparatus.

To achieve these objects, and in accordance with my invention, I provide measuring means which directly measure the incremental system losses $$\frac{\partial N_v}{\partial N_i}$$

and feed the measured values into the analog computer so that, since the loss factors ($B_{ik}$) are inherent in the incremental loss value, the loss formula in the computer directly "goes along" with all load changes of the interlinked distribution system.

According to one of the more specific features of my invention, I provide the analog computer with a model network system which comprises two individually complete component networks each simulating the longitudinal impedances of the actual interlinked distribution system without its generators, cross capacitances and loads; and I supply one of the component networks with currents which, relative to the axis of the hypothetical load current, are the conjugate-complex currents of the other component network. I further connect to the model system a number of transformer and measuring circuits of which the transformer circuits enforce a proportional correlation of the feeder currents of the respective contributing power stations to a hypothetical load current which is produced for simulating the loads that, as mentioned, are not included in the model network as such; whereas the measuring circuits derive from the transformer circuits the incremental system losses per station:

$$\frac{\partial N_v}{\partial N_i} = 2\sum_{k=1}^{n} B_{ik} N_k$$

thus determining the incremental system losses directly, i.e., without actually using the loss factors $B_{ik}$.

As mentioned, a computer according to the above-mentioned features of my invention, has its model system of networks traversed by respective mutually conjugate currents, each component network being a complete image of the longitudinal impedances of the actual power distribution system. This is necessary, particularly in large systems, if maximum accuracy is desired, because the matrix of the transformed longitudinal impedances, or the matrix of the loss factors (B) is no longer symmetrical in a model network without load-simulating members in which the load current is constrainedly distributed in the correct proportions upon the respective power feeder points. However, and in accordance with another feature of my invention, one of the two above-mentioned component model networks can be omitted in certain cases thus providing the computer with only one model network. This can be done, for instance, in relatively small interlinked distribution systems where the asymmetry of the B-matrix is not appreciable.

The above-mentioned and other objects, advantages and features of the invention will be apparent from, and will be mentioned in, the following description in conjunction with the drawings in which.

Figure 1:
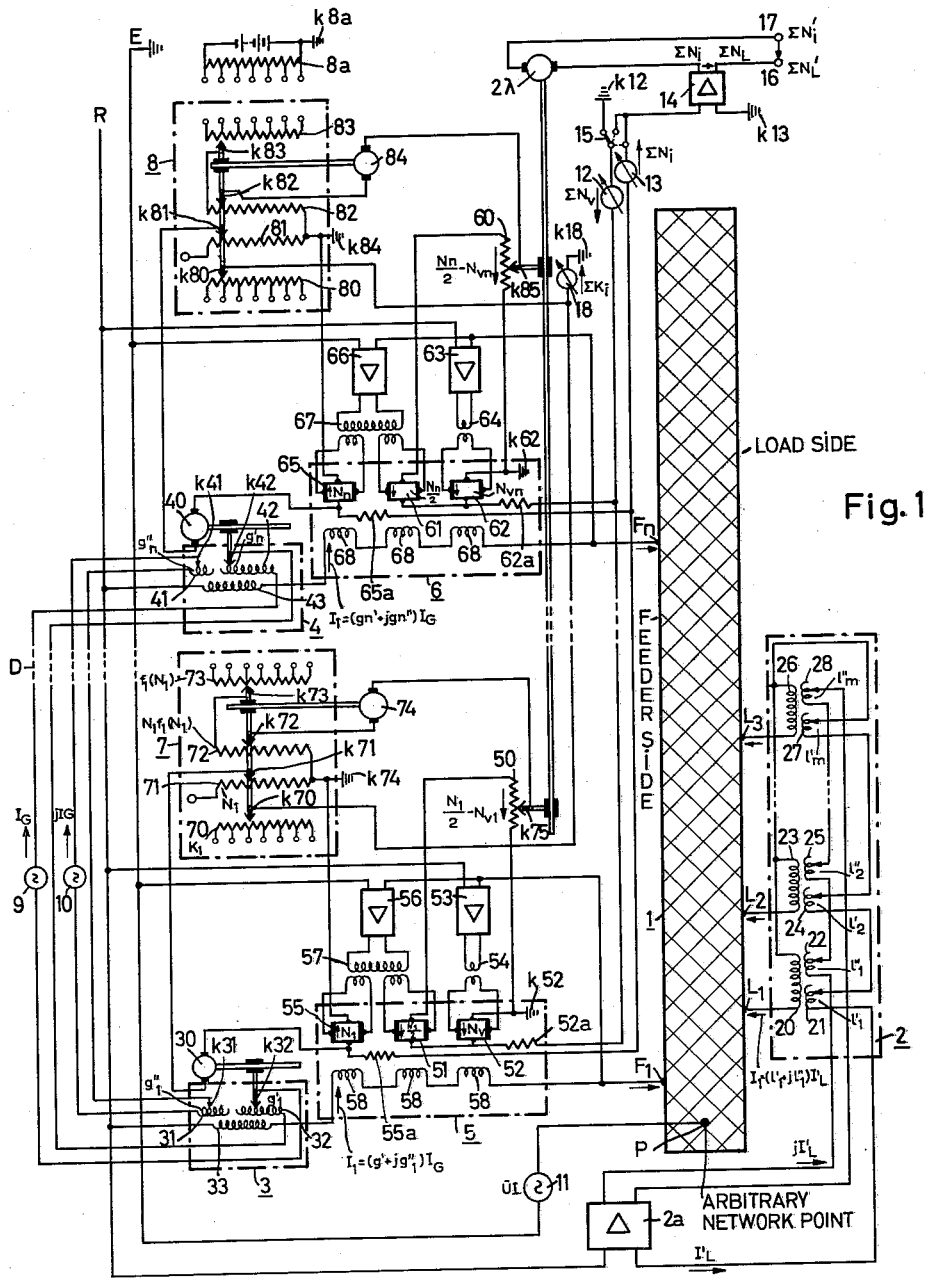
FIG. 1 shows schematically the circuit diagram of an economic dispatch computer according to the invention, including a single model network with correlated measuring and transformer devices.
Figure 3:
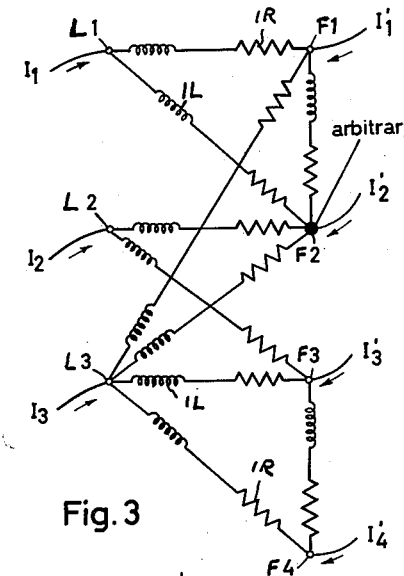
FIG. 3 shows the model network composed of resistors and inductance members that simulate the longitudinal impedances of the actual interlinked power distribution system.
Figure 3A:
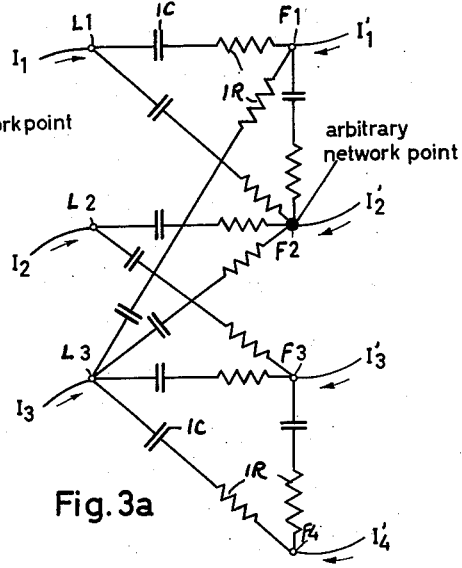
FIG. 3a shows a modified model network in which the transmission impedances are simulated by resistors and capacitors.
Figure 4:
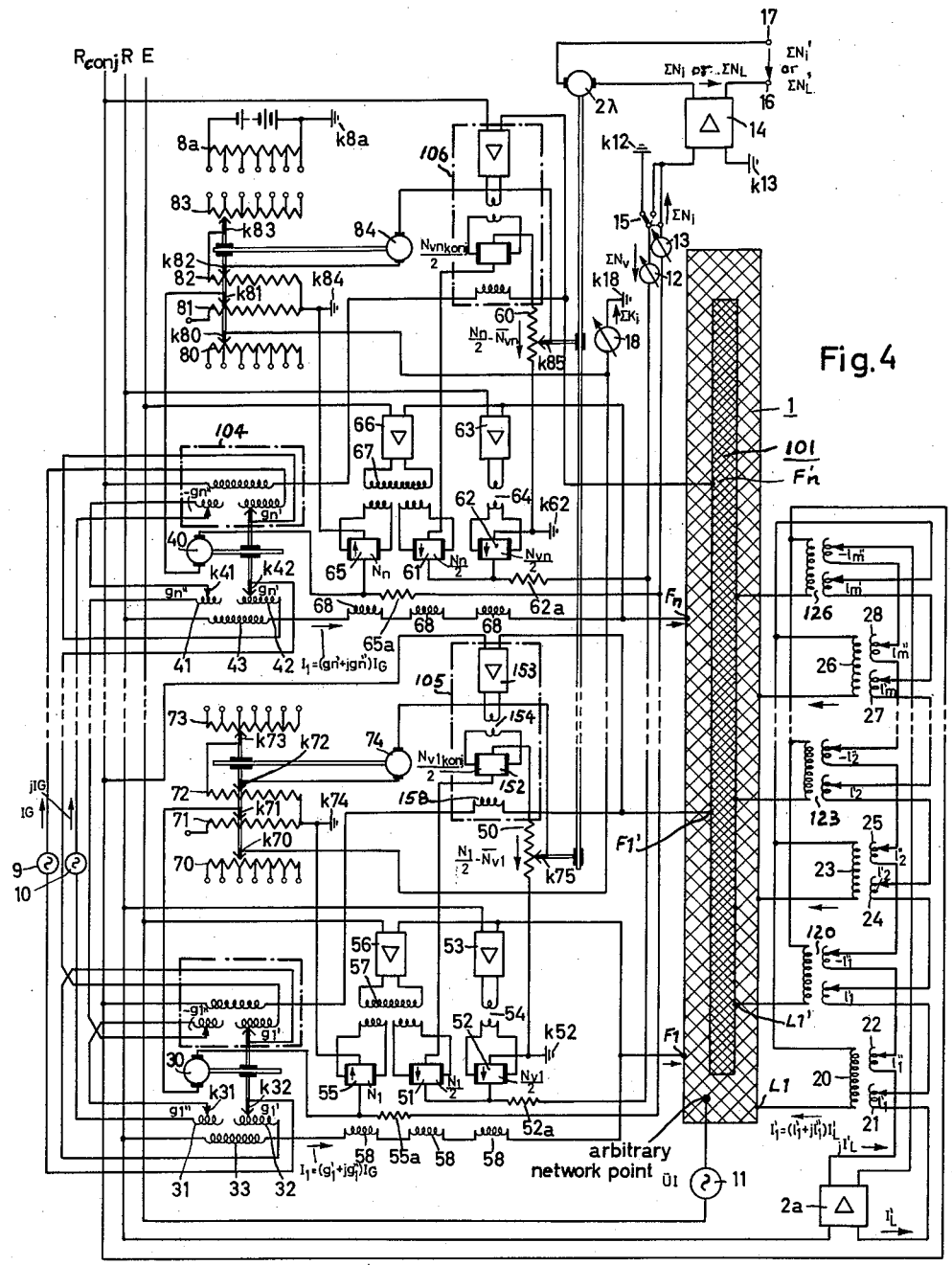
FIG. 4 is the circuit diagram of another economic dispatch computer according to the invention wherein the model system comprises two individually complete and conjugate networks of the transmission impedances.

The embodiment of the computer illustrated in FIG. 1 is of the above-mentioned type in which the model system consists of only one network 1 equivalent to the non-conjugate (active) longitudinal impedances of the power distribution system. For example, in FIG. 3 the network is shown composed of resistors and inductance coils, such as those denoted by 1R and 1L respectively. FIG. 3a shows a modified but equivalent design of such a network in which the impedances of the actual distribution system are represented by resistors 1R and capacitors 1C. For simplicity, the networks of FIGS. 3 and 3a are shown for a total of four delivering power stations whose respective feeder points appear at F1, F2, F3, F4 and which supply respective currents $I'_1$, $I'_2$, $I'_3$ and $I'_4$. The load side of the network in FIG. 3 or FIG. 4 is shown to have three supply points L1, L2, L3 for respective currents $I_1$, $I_2$, $I_3$.

Figure 5:
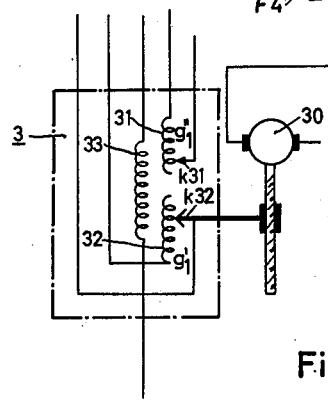
FIG. 5 illustrates, on a large scale, the circuit diagrams of one of the analog computing mechanisms and one of the transforming devices that form part of the dispatch computer according to FIGS. 1, 2 or 4.

Reverting to FIG. 1, it will be noted that the load-side points L1, L2, L3 of the network 1 are connected to a transformer device 2. Connected to the feeder points are respective transformer devices 3 and 4 of which one is separately shown in FIG. 5. The diagram of FIG. 1 is drawn for only two power stations, namely the 1st and the $n$-th, it being understood that one transformer device 3, 4 is assigned to each of the respective stations, and that any number of additional stations may be represented, having their respective computer components located in the portion of the diagram illustrated by broken lines at D.

Figure 6:
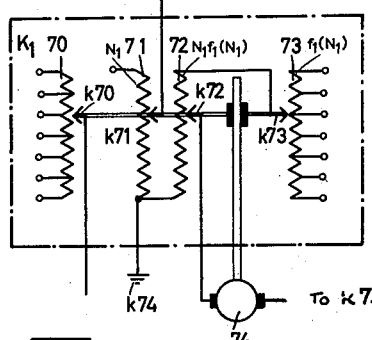
FIG. 6 is a schematic illustration of one of the Hall-voltage generators that form components of the computers according to FIGS. 1, 2 and 4.
Figure 6:
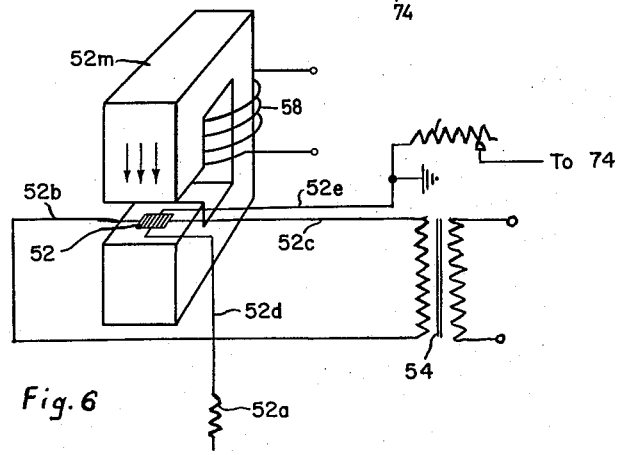

The network 1 is further connected with measuring devices 5 and 6, one for each of the respective power stations of the distribution system. The measuring devices 5, 6 have all the same design and are each provided with a group of electric multiplier units which, as shown, are preferably of the Hall-generator type, one of them being separately shown in FIG. 6.

The transformer devices 2, 3 and 4 operate to correlate the feeder currents $I_r$ of the contributing power stations of the hypothetical load current $I_L$; and the measuring devices 5, 6 directly derive from the output of these transformer devices the incremental transmission losses $$\frac{\partial N_v}{\partial N_i}$$

for the respective power stations. Details of the devices 2, 3, 4, 5, 6 and their functioning will be described further below.

The dispatch computer is further provided with analog computing mechanisms 7, 8, one for each of the contributing power stations. Each of these mechanisms comprises a group of potentiometers automatically controlled by a motor 74 or 84. All mechanisms 7, 8 are supplied with constant direct-current voltage from a common voltage-divider source 8a grounded at k8a. The analog mechanisms are all similar, one of them being separately shown in FIG. 5. The mechanism 7 according to FIG. 5 comprises four potentiometer rheostats 70, 71, 72 and 73 whose respective slide contacts k70, k71, k72, k73 are all operated from the control motor 74. The rheostats 70 and 73 have respective series of taps connected with the corresponding taps of the voltage source 8a (FIG. 1). The various rheostats provide respective tapped-off voltages indicative of calculating magnitudes. Thus, potentiometer 70 furnishes a voltage proportional to the power generating cost per hour; potentiometer 71 furnishes between its grounded terminal k74 and its slider k71 a voltage indicative of the active power delivered by the individual station, potentiometer 72 provides a tap voltage proportional to a product term of the optimizing equation to be satisfied; and potentiometer 73 supplies a voltage indicative of the fuel cost per station. As shown, the four slide contacts may all be joined, or geared together, with the control motor 74, and each of rheostats 70, 71, 72, 73 may be given the proper respective resistance graduation along the travel path of its slider. The operation of the analog mechanisms and their individual rheostats will be further explained in a later place.

Before continuing the description of the apparatus, the meaning and purpose of the "hypothetical load current" will first be explained.

Assume, for example, that the interlinked power distribution networks comprise a total of ten power-feeding stations and a total of fifty power-consuming loads. Then the ten stations and the fifty loads may be looked upon as forming two respective complex entities. That is, the fifty loads are considered a single "hypothetical" load whose behavior simulates the effect of the totality of all individual loads. This single hypothetical load would be traversed by a single current which, expressed by a complex mathematical term, substitutes the fifty currents of the respective individual loads. This one current, the "hypothetical load current," must correspond to a single hypothetical feeder current delivered by the totality of power generators.

Hence, these considerations in the sense of the network-transformation theory, have the result of converting the system of ten stations and fifty loads, inclusive of the impedance means that interconnect the stations and loads, into a single power-generating, transmitting and consuming system which, for computation purposes, is equivalent to the original, actually existing power distribution system. This single hypothetical power-generating, transmitting and consuming system is simulated in the computer according to the invention by the model network together with the transformer devices 2 to 4.

Only by introducing the concept of the hypothetical load current $I_L$ is it possible to express the transmission losses in the over-all power system exclusively in terms of the power delivered from the stations or of the distribution of this power onto the respective individual stations.

By way of further explanation, it may be added that, while the dispatch computer according to the present invention operates fundamentally in accordance with the optimizing Equation 1 given above, this equation, as built into the performance of the computing apparatus according to the invention, had to be modified as follows to make it suitable for the particular purposes and improvements desired.

If the above-presented loss Formula 2 is modified by forming the differential derivation for $N_i$, and only the first, namely the second-order member of the loss formula is considered, then one just obtains the bracket term in the sum represented by the original optimizing Equation 1. Hence:

$$\frac{\partial K_i}{\partial N_i} = \lambda \left[1 - \frac{\partial N_v}{\partial N_i}\right] \quad (3)$$

On the other hand, the incremental over-all system losses $N_{vi}$ caused by the $i$-th power station unit are given by $$N_{v_i} = N_i \cdot \sum_{k=1}^{n} B_{ik} \cdot N_k \quad (4)$$

($B_{ik}$ being assumed to be symmetrical). This Equation 4 expresses that the sum of the power supplied by all contributing stations is equal to the sum of all power losses in the entire network. Equation 4 results from the differentiation of the Equation 2 when neglecting the inessential loss coefficients of the first degree. It follows from Equation 4 that the incremental transmission losses are:

$$\frac{\partial N_v}{\partial N_i} = 2 \cdot \frac{N_{v_i}}{N_i} \quad (5)$$

because $$\frac{\partial N_v}{\partial N_i} = 2 \cdot \sum_{k=1}^{n} B_{ik} \cdot N_k \quad (6)$$

Equation 6 corresponds to the one given above in the definition of the term "$\lambda$," except that the inessential loss coefficient ($B_{i0}$) of the first order is neglected. If the Term 5 for the incremental transmission losses is introduced into the above-mentioned optimizing Equation 1, the following formula is obtained:

$$\frac{\partial K_i}{\partial N_i} = \lambda \left[1 - 2 \frac{N_{v_i}}{N_i}\right] \quad (7)$$

As mentioned, the model network 1 of the computing apparatus, in cooperation with the transformer and measuring devices 2 to 6, permits determining the incremental network transmission losses $N_{v_i}$, this being the term contained in the bracket of the last-mentioned Equation 7. It is then only necessary to divide by $N_i$ and to multiply with $\lambda$ in order to adjust the right-hand side of the Equation 7 to the particular value $$\frac{\partial K_i}{\partial N_i}$$

set up in the respective component computer mechanism 7, 8. However, for keeping the analog computing apparatus as simple as possible, the division by $N_i$ is circumvented and instead the Term 7 multiplied by $N_i$. In this manner the following ultimate optimizing equation is obtained:

$$N_i \cdot \frac{\partial K_i}{\partial N_i} = 2\lambda \left[\frac{N_i}{2} - N_{v_i}\right] \quad (8)$$

If this Condition 8 is satisfied, the costwise most economical operation of the over-all system of interlinked distribution networks is obtained. For any given load condition, the corresponding incremental contribution of the individual power stations remains unchanged as long as the collateral conditions $$\Sigma N_i - N_v = N_L' \text{ or } \Sigma N_i = \Sigma N_L + N_v = N_i'$$

remain met, wherein $N_L'$ and $N_i'$ denote the respective datum values.

The network transformation mentioned above when explaining the hypothetical load current, if embodied in circuitry, results ultimately in the illustrated model network 1 in combination with the appertaining transformer and measuring circuits 2 to 6. It can be shown that the stages of transformation required in the calculation can be realized by real and complex transformers. The transformers at the feeder side of the model network perform the function of so-called loss generators which merely supply the transmission losses attributable to the respective power stations and are not identical with the original power generators in the stations. The impedance network structure thus built up possesses originally no connection with ground. However, the parallel-operating loss generators, represented by the transformer devices 3, 4 together with respective auxiliary generators 9 and 10, are connected by a return lead R with the load-free load terminals.

The load-side transformers for enforcing the correct apportioning of the load current in dependence upon the hypothetical load current are complex. They are represented by the transformers shown at 2 enclosed by a dot-and-dash line, together with an appertaining ($l:j$)-amplifier $2a$. The transformers, called "injectors," are each provided with three windings. Since the injectors cannot be designated entirely free of resistance, they cause active losses which add themselves to the losses of the model network and thus may falsify the measuring result. However, a compensating circuit (FIG. 2) which eliminates such spurious losses may be used and will be described in a later place.

As explained, the model network has the peculiarity that the transformers on the feeder side and on the load side of the network impose upon it a power flow which corresponds to the actual distribution, although the generators of the computer are not called upon to produce the full power but are required only to supply the losses.

If now the original voltage of the actual interlinked system of networks, relative to ground, is introduced at an arbitrary network point of the model network, then such impressed voltage, in cooperation with the measuring circuits 3 and 6, affords simulating the full consumer loading although this loading is not actually produced in the model network and is not consumed in ohmic resistors ("blind" load effect). In the computer apparatus illustrated in FIG. 1, the original voltage U relative to ground E is impressed upon an arbitrary point P (or F2 in FIGS. 3, 3a) of the model network by means of a generator 11 and is also applied to the measuring devices 5 and 6.

As mentioned, the model network 1, inclusive of the transformer and measuring devices 2 to 6, cooperates with the computing mechanisms 7, 8 to satisfy the optimizing Condition 8. It will be remembered that the circuit diagram in FIG. 1 shows only the devices for the first and the n-th power station, the mechanisms 7 and 8 being correlated to these two stations respectively.

As mentioned above, each computing mechanism 7, 8 provides at its voltage divider 70 or 80 a tapped-off voltage proportional to the power-generating cost K per hour. It also provides at potentiometer 71 or 81 a voltage simulating the delivered active power $N_1$, $N_n$ of the respective stations. The potentiometer 72 or 82 supplies a voltage simulating the product $$N_1 \cdot \frac{\partial K_1}{\partial N_1} \text{ or } N_n \cdot \frac{\partial K_n}{\partial N_n}$$

which forms one term of the optimizing Equation 8. The voltage divider 73 or 83 in the analog mechanisms 7 or 8 further provides a voltage indicative of the incremental power-generating (fuel) cost $$\frac{\partial K_1}{\partial N_1}$$

or $$\frac{\partial K_n}{\partial N_n}$$

The motors 74, 84 for controlling the sliders $k70$ to $k73$ or $k80$ to $k83$ of the potentiometers are energized for reversible operation as follows. Motor 74 has one pole connected to slider $k72$, and motor 84 has a corresponding pole connected to slider $k82$. Each motor thus receives a voltage obtaining between the respective sliders and the appertaining grounded terminals $k74$, $k84$. These energizing voltages are equal to the values $$N_1 \cdot \frac{\partial K_1}{\partial N_1} \text{ and } N_n \cdot \frac{\partial K_n}{\partial N_n}$$

respectively.

The other pole of control motor 74 is connected to slider $k75$. The corresponding other pole of motor 84 is connected to slider $k85$. The two sliders $k75$ and $k85$ are jointly displaced under control by a motor denoted by $2\lambda$. The $2\lambda$ motor multiplies with the factor $2\lambda$ the voltages tapped off the respective measuring potentiometers 50 and 60. These voltages are proportional to the term $$\left(\frac{N_r}{2} - N_{v_r}\right)$$

of the optimizing Equation 8, wherein $r$ denotes the running index of the power stations.

The control motors 74, 84 are at rest when the voltage $$2\lambda \cdot \left(\frac{N_1}{2} - N_{v_1}\right)$$

tapped off between respective sliders $k75$, $k85$ and respective grounded terminals $k52$, $k62$ is equal to the respective voltages $$N_1 \frac{\partial K_1}{\partial N_1} \text{ and } N_n \frac{\partial K_n}{\partial N_n}$$

occurring between slider $k72$ or $k74$ on the one hand and slider $k82$ or $k84$ on the other hand. Under these conditions of voltage equality, the optimizing Equation 8 is satisfied.

The voltages that correspond to the respective terms $$\frac{N_r}{2}$$

$N_{v_r}$ in the bracket expression of the optimizing Equation 8 are produced in the Hall generators 51, 52 or 61, 62 of the measuring circuits 5, 6. Since all these Hall generators, as well as those denoted by 55 and 65, are of like design and basic functioning, it will suffice to describe only one of them in detail with reference to FIG. 6.

The Hall generator comprises a wafer 52 of semiconducting substance, the so-called Hall plate, consisting of crystalline indium arsenide or other elemental or compound material of suitable semiconductor properties, indium arsenide being used in the Hall generators now commercially available from the assignee of the present invention. The Hall plate 52 has two current supply leads 52b, 52c which permit passing an electric current through the plate, this current being alternating and supplied from a transformer 54 in the dispatch computer according to the invention. The Hall plate is further provided with two point-shaped or relatively short electrodes to which respective output leads 52d, 52e are attached. The Hall plate is disposed in the field gap of a magnetizable core 52m excited by a field coil 58. The gap is as narrow as permitted by the thickness of the plate 52 but is shown wider in FIG. 6 to permit also illustrating the plate. The magnetic flux, represented by arrows in FIG. 6, passes through the plate 52 in a direction perpendicular to the plane defined by the current axis 52b—52c and the Hall-voltage axis 52d—52e. In FIG. 1 only the Hall plates 51, 52, 55 and 61, 62, 65 and only the respective field coils 58 and 68 are shown, but it will be understood that each individual Hall generator is designed as explained with reference to FIG. 6.

When the magnetic field is zero, i.e., field coil 58 is not excited, while a current is flowing through plate 52 and leads 52b, 52c, both Hall electrodes have the same electric potential so that no output voltage is impressed between leads 52d and 52e. When the field coil 58 is excited, the two Hall electrodes assume respectively different potentials, and an alternating output voltage (Hall voltage) appears between leads 52d and 52e. This output voltage is proportional to the product of the excitation current in field coil 58 and the current passing through the Hall plate. Hence the Hall generator is essentially a multiplier and is so used in the dispatch computer according to the invention as will more fully appear below.

It should be observed that the measuring devices 5 and 6 operate with respectively different reference potentials, namely those of lead E and lead R. As explained, R is the return lead of the so-called loss generators, and lead E is a grounding lead connected to the generator 11 which elevates the voltage of the impedance combination in model 1 relative to ground by the original voltage U of the interlinked networks of the power distribution system.

For determining the power loss $N_{v_r}$, the Hall plates of the Hall generators 52, 62 are energized by voltage between return lead R and the feeder terminal F1 or F$n$ of the appertaining loss generator 3 or 4. This voltage is supplied to Hall generator 52 or 62 through an amplifier 53 or 63 and a transformer 54 or 64. For determining the supplied active power, the plates of the other Hall generators 51, 55 and 61, 65 are energized by the voltage obtaining between ground lead E and the feeder terminal F1 or Fn of the appertaining loss generator 3 or 4. The latter voltage is supplied to Hall generators 51 and 55 or 61 and 65 through an amplifier 56 or 66 and a transformer 57 or 67.

The magnetic field windings 58 and 68 of the two groups of Hall generators are excited by the incremental currents $I_1=(g_1+jg_1)\cdot I_G$ and $I_n=(g_n+jg_n\cdot I_G$. As a result, the Hall generators 55, 65 supply Hall output voltages proportional to $N_1$ and $N_n$ respectively; Hall generators 51 and 61 supply output voltages proportional to $$\frac{N_1}{2}$$

and $$\frac{N_n}{2}$$

and Hall generators 52 and 62 supply output voltages proportional to $N_{v_1}$ and $N_{v_n}$.

The output voltage of Hall generator 51 is connected in additive series relation to the output voltage of Hall generator 52 across the resistance of the measuring potentiometer 50 so that this potentiometer is impressed by a voltage proportional to the term $$\frac{N_1}{2}-N_{v_1}$$

Similarly, the Hall generators 61 and 62 are additively series connected across the resistor of measuring potentiometer 60 so that the latter is impressed by a voltage proportional to the term $$\frac{N_n}{2}-N_{v_n}$$

The purpose of the active-power measurement by means of the Hall generators 55, 65 will be more fully explained below.

The Hall generators 52 and 62 have their voltage output connected through respective ohmic resistors 52a and 62a with an instrument 12 for indicating the value $\Sigma N_v$. Similarly, the voltage output of Hall generators 55 and 65 is connected through respective resistors 55a and 65a with an instrument 13 for indicating the value $\Sigma N_i$. The instrument 13 ($\Sigma N_i$) is permanently connected in the input circuit of an amplifier 14. The instrument 12 ($\Sigma N_v$) can be selectively connected with the same amplifier 14 by means of a selector switch 15. The instrument 12, when connected by switch 15 with grounding terminal k12, measures the value $N_v$ between the grounding terminals k52, k62 and the grounding terminal k12, whereas the instrument 13 measures the value $N_i$ between the terminals k74, k84 and the grounding terminal k13 of amplifier 14.

The 2λ motor satisfies the collateral conditions $\Sigma(N_i-N_v)=\Sigma N_L'$ or $\Sigma N_i'=\Sigma(N_L+N_v)$, wherein $N_i'$ denotes the rated datum value of the active power delivered by all power stations, and $N_L'$ denotes the rated power consumption corresponding to the hypothetical load current (total load current of the over-all interlinked distribution system). The output terminals of amplifier 14 supply either a voltage proportional to $\Sigma N_i$ or $\Sigma N_L$ as may be desired, depending upon the selected setting of switch 15. The energizing circuit for motor 2λ is also the measuring input circuit for the entire dispatch computer and has input terminals 16 and 17 impressed by a voltage proportional to $\Sigma N_i'$ or $\Sigma N_L'$. The 2λ motor remains at rest as long as the mutually correlated voltage magnitudes are equal.

The computation and regulation of the optimum value $N_i$ of the delivered active power, upon occurrence of changes in load, cannot be effected exclusively by operation of the 2λ motor and the control motors 74, 84 of the analog mechanisms 7, 8, because it is first necessary to enforce in the model network 1 the new current distribution corresponding to the new load condition. This is the reason why the above-mentioned measurement of the active power by means of the Hall generators 55, 65 is necessary.

The automatic adjustment of the active power, effected in response to load changes by the control motors 74, 84 at potentiometers 71 and 81, has a controlling effect upon the auxiliary control motors 30, 40 due to the displacement of the slider contacts k71, k81 in the analog mechanisms 7, 8. Connected in the circuit of each auxiliary control motor 30, 40 are the output leads of one of the Hall generators 55, 65 which simulate the share of the active power $N_i$ to be contributed by each individual power station. It may be mentioned at this point that instead of connecting the auxiliary control motor 30 directly with the Hall-voltage circuit of the respective Hall generators, an amplifier for amplifying the Hall voltage may be interposed. Such auxiliary amplifiers, which may also be used wherever needed or desired at other locations of the circuitry, are not illustrated because their use and operation is generally known and not essential to the invention proper. When the active power $N_i$ simulated by the output voltage of the Hall generators 55, 65 is not equal to the voltage tapped off the potentiometers 71, 81 in the analog mechanisms 7, 8, then the respective auxiliary motors 30, 40 run in one or the other direction and thus vary the feeder-side conditions in the transformer devices (loss generators) 3, 4. These loss generators 3, 4 then enforce in the model network 1 a current distribution so correlated to the new load condition that the analog mechanisms set themselves to the costwise most economical active power values $N_i$. When the new setting is attained, the adjusted $N_i$ values differ from those previously effective.

The transformer devices 3, 4 of the loss generators are each represented by a three-winding transformer or "injector" 31 to 33 or 41 to 43 together with the respective appertaining additional generators 9 ($I_G$) and 10 ($jI_G$). The additional generators 9 and 10 drive currents through the injector windings 31, 32 or 41, 42 which, representing real and imaginary components $g_1'$, $g_n'$ or $jg_1''$, $jg_n''$, synthetically produce in the injector windings 33 and 43 the respective currents $I_1=(g_1'+jg_1'')\cdot I_G$ and $$I_n=(g_n'+jg_n'')$$

Thus the loss generators enforce the correct allotment of the hypothetical generator current $I_G$ onto the individual feeder points F1, Fn of the phantom network.

The injector taps k31 and k41 are given a selected but fixed adjustment in accordance with the characteristic load range. The auxiliary control motors 30, 40, when responding to load changes, displace the respective slide contacts k32, k42, thus varying the real component of the hypothetical generator current $I_G$ in the sense already discussed. During such displacement the control motors 30 and 74 have a corrective influence upon each other, and the control motors 40 and 84 also correct each other in accordance with a follow-up regulation.

The transfer from the feeder-side loss generators, that is from the currents $I_1$, $I_n$ in the injector windings 33 and 43, to the load side and the transformer device 2 of the model network is effected in the $(l:j)$-transmitter constituted by an amplifier 2a. This amplifier has the same significance for the coming-about of the hypothetical load current, as the additional generators 9, 10 have for the hypothetical generator sum current; that is, the amplifier 2a delivers the hypothetical load current $I_L$ and the hypothetical load current $jI_L$, the latter being displaced 90° (electrical) relative to the active load current $I_L$. The input signal for amplifier 2a is given by the sum load current $I_L'$ which is composed of all individual loads $l_1$ to $l_n$ and has the same amount as the generator sum current. A current $jI_L'$ of the same amount but 90° phase displaced from current $I_L'$ is injected through the amplifier output circuit, the phase displacement being effected in the amplifier. This determines the potential for the conductor R.

On the load side of the model network, both currents $I_L$ and $jI_L$ are fed to the three-winding transformers 20 to 22, 23 to 25, and 26 to 28 where they produce from $I_L$ and $jI_L$ the active and the reactive (wattless) components of the particular, correlated load currents $I_r$.

The hypothetical load current $I_L$ traverses the $l_n'$-windings 21, 24 and 27, whereas the 90° displaced, hypothetical load current $jI_L$ passes through the $l_n''$-windings 22, 25 and 28. By synthesis there results in the injector windings 20, 23 and 26 the proportional load currents $I_r = (l_r' + jl_r'') \cdot I_L$.

While on the feeder side the conditions for the active and reactive (wattless) components $g_r'$ and $jg_r''$ can be adjusted, for example, in such a manner that $\Sigma g_r'' = 0$ (the resulting imaginary portion is zero) and $\Sigma g_r' =$ real (on the feeder side the resulting real portion must not necessarily be equal to 1), the load side of the model network is subject to a limitation relative to similar conditions applying to $l_r'$ and $jl_r''$. That is, on the load side $l_r = 1$, where $l = l_r' + jl_r''$. For that reason the injector taps at windings 21, 22, 24, 25, 27, 28 are given a fixed setting in accordance with the characteristic load range. If, also on the load side of the model network, one would set $\Sigma l_r' = 1$ and $\Sigma l_r'' = 0$, then the hypothetical load current $I_L$ would be equal to the hypothetical generated sum current $I_G$. The magnitudes $l_1' \ l_2' \ldots l_m'$ and $jl_1''$, $jl_2'' \ldots jl_m''$ are dimensionless factors which are characteristic, respectively, of the active and reactive shares of the load currents. These magnitudes are empirically determined by assigning respective shares of the sum load current to the individual consumers or consumer groups.

Figure 2:
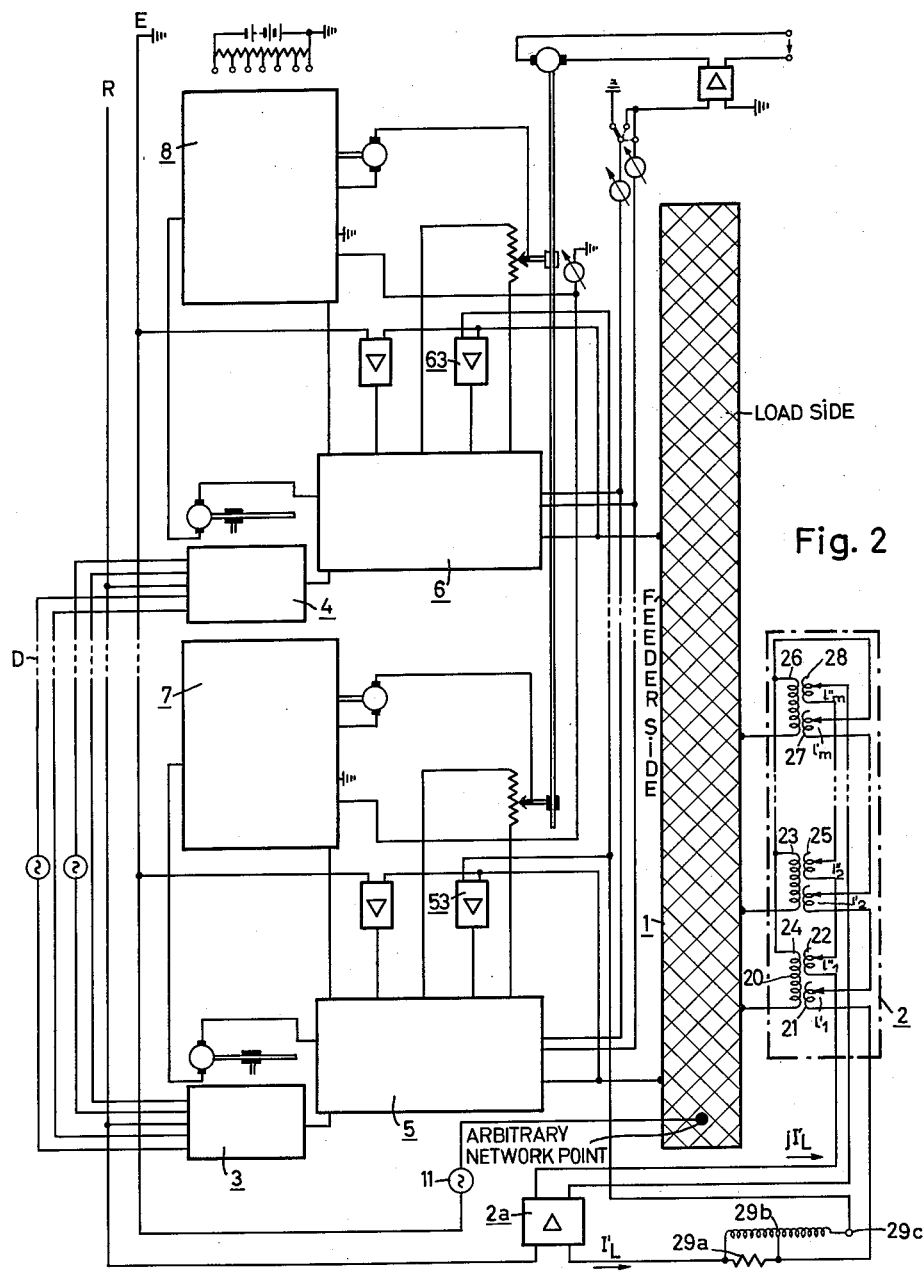
FIG. 2 shows generally the same dispatch computer except for a modification and improvement of a load-current transmitter.

It has been mentioned that the three-winding transformers involve losses and thus may appreciably falsify the measurement of the transmission losses in the distribution system. This can be avoided by a compensating circuit as illustrated in FIG. 2, which otherwise shows the same economic dispatch computer as described above with reference to FIG. 1. An ohmic resistor 29a is serially connected in the common lead extending to the windings 21, 24 and 27 for supplying the hypothetical load current $I_L$ thereto. That is, the resistor 29a is located between the ($l:j$)-transmitter 2a and the winding 21. The resistor 29a has a resistance magnitude equal to the sum of the active resistances of windings 21, 22 and 27. Connected parallel to resistor 29a is one half of an autotransformer 29b. The free terminal 29c of the other half serves as the connecting point for the entrance to the amplifiers 53, 63 which in FIG. 1 are connected to the return lead R and which form part of the measuring devices 5, 6.

Referring to FIG. 1, the above-described dispatch computer operates as follows.

As long as the over-all system of distribution networks operates under such conditions that the total of the delivered power $\Sigma N_i$ corresponds to the desired datum value $\Sigma N_i'$, and the total loading $\Sigma N_L$ corresponds to the datum value $\Sigma N_L'$, the voltage derived from the distribution system and impressed upon the input terminals 16 and 17 of the dispatch computer is balanced by the series-opposed output voltage of the amplifier 14 so that the 2λ motor remains at rest. Whenever the value $\Sigma N_i$ departs from $\Sigma N_i'$, or $\Sigma N_L$ departs from $\Sigma N_L'$, due to load changes in the power distribution system, the voltage across terminals 16, 17 departs from the output voltage of amplifier 14 so that a differential error voltage is impressed upon the 2λ motor which causes the motor to run in one or the other direction depending upon the sense of departure. The motor then displaces the sliders $k75$ and $k85$ in respective potentiometers 50 and 60 so that the optimizing balance for the computer mechanisms 7 and 8 is disturbed. As a result, the control motors 74 and 84 also commence running in the proper direction and thus adjust an active power $N_r$ at respective potentiometers 71 and 81, depending upon the amount of the disturbance. The active power values $N_r$ thus adjusted do not yet correspond to the costwise most favorable amount of active power.

The new setting of the active power magnitudes at potentiometers 71, 81 produces voltage differences at the auxiliary control motors 30 and 40 so that these motors likewise commence running and, acting through the transformer circuits, enforce a new current distribution at the feeder-side and load-side terminals F1, F$n$ and L1, L2, L3 of the phantom network. During such adjustment there occurs a follow-up action between motor 30 and control motor 74 on the one hand, and between motor 40 and control motor 84 on the other hand. This mutual, pendulous control of the motors decays so rapidly that a few moments after the load changes in the power distribution system the correct active-power values $K_i$ are adjusted at the respective potentiometers 71 and 81. These values can be read off these potentiometers or can be directly transmitted to the individual power stations for indication or automatic power regulation in these stations.

The adjusted total active power values can be read off the indicating instrument 13, and the total transmission losses in the interlinked power distribution system are indicated by instrument 12. The sum of the power generating cost $\Sigma K_i$ is indicated at instrument 18 which is connected between the sliders $k70$, $k80$ on the one hand and the grounding terminals $k18$ on the other hand.

The new active-power values are thus available immediately and without the preceding time-consuming calculation of the $B_{ik}$ values heretofore necessary.

While an economic dispatch computer with only one model network as described with reference to FIG. 1 satisfies accuracy requirements sufficient for smaller power distribution systems, it is necessary to add a second model network of the transmission impedances and to supply it with currents that are the conjugates of those in the first model, if more exacting accuracy requirements are to be met, particularly in large interlinked distribution systems. The economic dispatch computer illustrated in FIG. 4 is provided with such conjugate-twin networks.

The model network 1 of the computer simulates the longitudinal impedances of the interlinked power distribution system in the same manner as explained above with reference to FIGS. 1 and 3 or 3a and is connected with an organization of components also corresponding to FIG. 1, as is apparent from the use of identical reference characters in FIGS. 1 and 4 for similar components respectively. Consequently, the foregoing description referring to FIGS. 1 through 6 is also applicable to the corresponding set of components in the dispatch computer of FIG. 4.

The second model network 101 of the computer shown in FIG. 4 likewise simulates the longitudinal impedances of the power distribution system in the same manner as the network 1. However, the network 101 is traversed by currents that are the conjugates of those flowing in network 1. The generator and load currents, conjugate to those of network 1 and hence vectorially perpendicular to the network 1, are introduced into model network 2 with the opposite (negative) sign to obtain the improved accuracy desired.

While, for lucidity of illustration, the conjugate network 101 is shown superimposed upon network 1, it should be understood that the network 2 is not a component of network 1 but forms a separate and individually complete entity. That is, network 101 may be located above or beside network 1. Both networks are connected with the coacting transformer devices, measuring devices and analog computer mechanisms in the manner and by the means described presently.

Referring first to the load side of both model networks, the network 101 is provided with load-side terminal points that correspond exactly to those of network 1. For example, point L1' of network 101 corresponds to point L1 of network 1. The transformer device 2 (FIG. 1) is modified by providing it with additional three-winding transformers or injectors 120, 123 and 126 which, as to design, performance and circuitry, correspond to the transformers 20, 23 and 26 connected with network 1. All individual injectors of the transformer device on the load side of both model networks are connected to the transmitting amplifier 2a in the same manner as described with reference to FIG. 1.

The transformer devices 3 and 4 (FIG. 1) are supplemented in the dispatch computer of FIG. 4 by respective sets of three-winding transformers 103 and 104 each of which is controlled by the same control motor 30 or 40 that changes the setting of the three-winding transformer 3 or 4 described above with reference to FIG. 1.

Like in the dispatch computer according to FIG. 1, the two Hall generators 51 and 52 in FIG. 4 have their respective output voltages connected in additive series relation to the potentiometer 50. However, the measuring device in FIG. 4 is supplemented by a measuring unit generally denoted by 105, which comprises a third Hall generator 152 whose output is also connected in series with potentiometer 50 and in series with the output voltages of generators 51 and 52. The Hall generator 152 has its magnetic field coil 158 excited by the voltage occurring between the feeder point F1' of the conjugate network 101 and an additional return lead $R_{conj}$. Current is supplied to the plate of Hall generator 152 through a transformer 154 from an amplifier 153 which likewise receives input voltage between feeder point F1' and return lead $R_{conj}$.

The modification involving the addition of Hall generator 152, of course, is to be made in each measuring device assigned to the individual power stations. Thus, the measuring device 6 (FIG. 1) is supplemented in the dispatch computer of FIG. 4 by an additional measuring unit 106 whose design and performance correspond to the unit 105 described above.

In contrast to FIG. 1, the Hall generator 52 produces an output voltage whose value corresponds to $N_{v_1}/2$ instead of the value $N_{v_1}$. The additional Hall generator 152 produces an output value corresponding to the delivered wattless power $$N_{v_1} \text{ conj.} = N_{v_1}'/2$$

It can be shown mathematically that by virtue of the added Hall generator 152, the voltage tapped off the potentiometer 50 is proportional to the median value of the power loss $N_{v_j}$, which takes into account not only the active power but also the reactive power to be delivered by the respective power stations.

I claim:

1. An economic dispatch computer for an alternating-current distribution system of interlinked power generating stations, comprising a model network of transmission impedances equivalent to those of the system, said network having load-side terminal points and having feeder points corresponding to those of the respective stations; alternating-current supply means having control means responsive to the load conditions of the system for imparting to said network a current-flow distribution simulating that in the system, said current supply means comprising for each power station a group of transformer devices connected to one of said respective feeder points and to said load-side terminals; a number of measuring means correlated to the respective power stations, each of said measuring means being connected to one of said respective feeder points for response to current and voltage values of the power passing into said network at said one feeder point, and each of said measuring means being continuously connected to one of said respective groups of transformer devices for deriving therefrom an output voltage dependent upon the incremental transmission losses of an individual station, whereby the incremental transmission losses of all said interlinked stations are simultaneously ascertained by said number of measuring means; a number of potentiometer means correlated to the respective stations and having each an adjustable tap voltage indicative of the incremental power production cost of an individual station; and comparator means connected with said measuring means and said potentiometer means for comparing said two voltages for each of the respective stations; said potentiometer means having a displaceable member for adjusting said tap voltage, and control means connecting said comparator with said member for controlling said member toward maintaining the sum of said two voltages at a given value.

2. An economic dispatch computer for an alternating-current distribution system of interlinked power generating stations, comprising a network of transmission impedances equivalent to those of the actual system, said network having feeder points and load-side points, current supply means comprising a group of transformer devices connected to said feeder points and to said load-side points and having in said network a current-flow distribution simulating that of the distribution system; a number of adjustable analog computer devices assigned to the respective stations, each of said devices comprising potentiometer means adjustable in accordance with the amount of power delivery from one of said stations and further potentiometer means adjustable in accordance with the incremental power production cost of said one station, and each of said computer devices having a computer output voltage indicative of the incremental power production cost in dependence upon the adjusted magnitude of delivered power; a multiplier assembly for each of the respective stations, each multiplier assembly having two input circuits and a multiplier output circuit, one of said input circuits being connected to one of said feeder points for response to a given network condition, said other input circuit being connected to said computer device assigned to the same station for response to the value of the average incremental cost of delivered power, whereby said multiplier assembly directly computes the incremental transmission losses and said output circuit has a voltage indicative of said losses; a comparator for each of the respective stations, said comparator being connected with said computer output voltage and with said multiplier output voltage for comparing the incremental transmission losses with the incremental production cost; and control means connected between said comparator and said computer device for adjusting said output voltage of said device in dependence upon the difference of comparison so as to maintain said difference equal to zero.

3. An economic dispatch computer for a power distribution system of interlinked power generating stations, comprising two individually complete model networks of impedance members equivalent to the transmission impedances of the actual system exclusive of its generators, cross capacitances and loads; each of said networks having feeder points and load-side points, current supply means comprising a group of transformer devices connecting said supply means to said respective feeder points and to said load-side points and having in said network a current-flow distribution simulating that of the actual system; said respective current supply means of said two networks being coupled in 90° phase relation to each other whereby the currents in one of said networks are the conjugate-complex values of those in the other network; a group of measuring means connected to said respective feeder points for response to the current and voltage values of the currents fed to said respective feeder points, said measuring means being connected to said respective transformer devices for deriving from the transformer output a voltage dependent upon the incremental transmission losses, potentiometer means having a tap voltage indicative of the incremental power roduction cost, and a group of comparator means of which each is connected with said measuring means and said potentiometer means assigned to one of the respective stations for comparing said two voltages, said potentiometer means having a displaceable member for varying said tap voltage, and control means connecting said comparator with said member for regulating said member toward maintaining the sum of said two voltages at a given value.

4. An economic dispatch computer according to claim 2, comprising grounded voltage-generating means connected to a point of said network and having between said network and ground a voltage corresponding to that of the power distribution system.

5. An economic dispatch computer for an interlinked power distribution system, comprising a network of transmission impedances equivalent to those of the actual system, said network having load-side terminals and feeder points assigned to the respective power stations of the system; current supply means providing a hypothetical load current equivalent to the total loads of said system, said supply means comprising respective transformer devices connected to said feeder points and said terminals, said transformer devices comprising for each of the respective power stations a regulating feeder transformer and a load-side transformer device, said regulating transformer being connected to the feeder point and having control means for varying the incremental feeder current in dependence upon the hypothetical load current; said load-side transformer device being connected to said terminals for supplying said network with load-simulating currents whereby said transformer devices jointly impose upon said network a power distribution equivalent to that of said system; a computer assembly for each of the respective stations, said assembly having a number of variable-voltage means, one of said voltage means being indicative of the station power-production cost per hour ($K_i$), a second one of said voltage means being indicative of the delivered active power per station ($N_i$), a third one of said voltage means being indicative of the incremental power production cost $$\left(\frac{\partial K_i}{\partial N_i}\right)$$

and a fourth one of said voltage means being indicative of the product of delivered active power times incremental production cost $$\left(N_i\frac{\partial K_i}{\partial N_i}\right)$$

and said computer assembly having control means connected with said variable-voltage means for conjointly varying said indicative voltages; a measuring assembly comprising two multipliers for each of the respective power stations, each of said multipliers having two input circuits and an output circuit to form a product of the input magnitudes, one input circuit of each multiplier being connected in current-responsive relation to said feeder point and said regulating feeder transformer to be energized in accordance with the incremental feeder current, the other input circuit of said respective multipliers being connected to said feeder point in voltage-responsive relation to said current supply means and to said actual system respectively whereby said output circuits provide voltages proportional to the incremental delivered power ($N_i$) and the incremental transmission losses ($N_{v_i}$) per station; a reference potentiometer to which said two output circuits are connected in mutually opposed voltage relation so as to impress said reference potentiometer with a differential voltage corresponding to the term $$\left(\frac{N_i}{2}-N_{v_i}\right)$$

said reference potentiometer having a displaceable tap defining a tapped-off portion which forms a source of first control voltage for said control means of said computer assembly, a condition-responsive drive having a motor drivingly connected with said respective taps of said potentiometers and having a motor control circuit with terminals for connection to the system to provide a signal voltage proportional to the datum value of incremental delivered power, said motor control circuit having a voltage supply member secondarily connected in series opposed relation to said signal voltage and primarily connected with said measuring assembly to supply said motor control circuit with reference voltage corresponding to the incremental delivered power whereby said drive motor is caused to displace said tap upon departure of the delivered power from the datum value, said drive having a tap-displacement characteristic corresponding to the average incremental delivered-power cost ($\lambda$) per station so as to make said first control voltage correspond to the term $$2\lambda\left(\frac{N_i}{2}-N_{v_i}\right)$$

said fourth voltage means of said computer assembly forming a source of a second voltage for said control means of said computer assembly, said first and second voltages being series opposed so as to cause said control means to vary said variable voltage means only when the sum of said first and second control voltages departs from zero; whereby the dispatch computer operates to substantially satisfy the condition $$2\lambda\left(\frac{N_i}{2}-N_{v_i}\right)=N_i\frac{\partial K_i}{\partial N_i}$$

and any of the resulting voltage settings in said computer and measuring assemblies are available as computer output magnitudes.

6. In an economic dispatch computer according to claim 5, said variable voltage means of said computer assembly comprising respective potentiometer rheostats each having a displaceable tap contact, said control means of said computer having a reversible motor in driving connection with said tap contacts and having an energizing circuit connected between the tap contact of said fourth voltage means and the tap of said reference potentiometer.

7. In an economic dispatch computer according to claim 5, said control means of said regulating feeder transformer for varying the incremental feeder current in dependence upon the hypothetical load current comprising a displaceable member and an auxiliary motor in driving connection with said displaceable member, said auxiliary motor having an energizing circuit comprising two auxiliary voltage sources in series opposed relation to each other, one of said auxiliary sources being formed by said second voltage means of said computer to provide an auxiliary voltage indicative of computed incremental delivered power, the other auxiliary source being formed by said measuring assembly to supply a second auxiliary voltage corresponding to the measured incremental delivered power, whereby said regulating transformer is automatically regulated in response to departures of said two auxiliary voltages from each other.

8. In an economic dispatch computer according to claim 2, said transformer devices comprising a number of three-winding transformers each having a secondary winding connected to one of said respective feeder points and one of said load-side points, each of said transformers having two primary windings; and said current supply means comprising two component circuits for supplying an active and a wattless current respectively, said two component circuits being connected with said two primary windings respectively of said transformers.

9. In an economic dispatch computer according to claim 8, said multiplying computer assembly comprising for each station a group of three Hall generators each having a field winding connected in series with the secondary winding of said transformer at the feeder point of the station, two of said Hall generators having a plate circuit connected to the system voltage relative to ground and having respective output circuits whose voltages correspond to the full value ($N_i$) and to one-half $$\left(\frac{N_i}{2}\right)$$

of the incremental delivered active power, said transformer secondary windings at the feeder-point side of said impedance network having a return lead in common, and the third Hall generator having a plate circuit connected to the voltage between said impedance network and said return lead and having an output circuit whose voltage corresponds to the incremental power loss ($N_v$).

10. In an economic dispatch computer according to claim 9, said comparator comprising for each station a potentiometric resistor having a displaceable tap electrically connected with said computer device for controlling said computer output voltage, said first and said second Hall generators having their respective output circuits connected in series with each other and in series with said resistor, whereby said resistor is impressed by a voltage proportional to the difference $$\left(\frac{N_i}{2} - N_{v_i}\right)$$

of said output voltages of said second and first Hall generators respectively.

11. In an economic dispatch computer according to claim 5, said regulating feeder transformer having a regulating motor for varying said incremental feeder current; said computer assembly comprising a potentiometer mechanism having displaceable tap contacts for providing said respective indicative voltages, and said control means of said computer assembly having a control motor connected with said contacts for conjointly displacing them, said control motor being energized in differential dependence upon said sources of first and second voltages; said transformer regulating motor having an energizing circuit connected to said measuring assembly to receive therefrom a voltage corresponding to the incremental delivered active power and being also connected to said computer-assembly voltage-means having a voltage indicative of the adjusted incremental delivered active power so as to vary the setting of said regulating transformer when the sum of said two latter voltages departs from zero; whereby said control motor and said regulating motor mutually control each other in accordance with a follow-up regulation under primary control by said condition-responsive drive so as to satisfy the optimizing equation:

$$N_i \cdot \frac{\partial K_i}{\partial N_i} = 2\lambda \left(\frac{N_i}{2} - N_{v_i}\right)$$

12. In an economic dispatch computer according to claim 1, said tap voltage of said poteniometer means corresponding to the value $$N_i \cdot \frac{\partial K_i}{\partial N_i}$$

wherein $N_i$ denotes the incremental delivered active power and $K_i$ denotes the incremental power production cost per time unit; said output voltage of said measuring means corresponding to the value $$2\lambda\left(\frac{N_i}{2} - N_{v_i}\right)$$

wherein $\lambda$ is the average incremental delivered-power cost of the entire distribution system and $N_{v_i}$ is the incremental transmission loss of the station; and said control means for varying said tap voltage being responsive to departure of the sum of said two values from zero.

13. In an economic dispatch computer according to claim 1, each of said groups of transformer devices comprising a three-winding transformer having a secondary winding connected to said feeder point and having two primary windings, said current supply means having two component primary circuits including said respective primary windings for supplying an active and reactive current component respectively, the active-current primary circuit being regulatable and having a displaceable control member; a reversible regulating motor connected with said control member; each of said measuring means comprising a Hall generator having two input circuits and a multiplier output circuit, one of said input circuits being connected in series with said secondary winding to be traversed by the current flowing through said feeder point, the other input circuit being connected in voltage-responsive relation to said secondary winding whereby said multiplier output circuit provides a resultant voltage proportional to the incremental delivered active power of the station; said potentiometer means comprising a potentiometer member having a displaceable tap contact defining a datum voltage indicative of the desired datum value of the incremental delivered active power; sensing means responsive to the system loading and connected with said potentiometer member for displacing said tap contact to adjust said datum voltage; said regulating motor being connected to said multiplier output circuit and to said tap contact and responsive to departure of said resultant voltage from said adjusted datum voltage.

14. In an economic dispatch computer according to claim 13, said sensing means comprising another reversible motor and a sensing circuit connected to said latter motor, said sensing circuit having a first voltage source 16, 17 whose voltage is indicative of the datum value of the total power passing through the distribution system and having a second voltage source 14 connected with said measuring means 5, said second source having a voltage indicative of the measured incremental power and being connected in series-opposed relation to the voltage of said first source, whereby said latter motor responds to departure of said two source voltages from each other; said comparator having a potentiometer rheostat connected to said measuring means and impressed from said measuring means by a voltage corresponding to the value $$\frac{N_i}{2} - N_{v_i}$$

wherein $N_i$ denotes the incremental delivered active power and $N_{v_i}$ denotes the incremental transmission losses; said latter motor being drivingly connected with said displaceable member of said comparator for regulating said tap voltage of said comparator so as to correspond to the value $$2\lambda\left(\frac{N_i}{2} - N_{v_i}\right)$$

wherein $\lambda$ denotes the potentiometer-variation characteristic and corresponds to the average incremental delivered-power cost of the entire distribution system.

15. An economic dispatch computer according to claim 8, comprising a complex-current transmitter 2a connecting said three-winding transformers on the feeder-point side of said network with those connected to said load-side points; and a compensator for compensating the active losses due to resistance of said transformers, said compensator comprising an ohmic resistor whose resistance corresponds to said transformer resistance, said resistor being connected between said transmitter and those primary windings of said load-side transformers that carry the real component of the current being supplied to said network through said load-side points; and an autotransformer having a midpoint so as to form two half-portions, one of said portions being connected parallel to said resistor, said other portion having an end terminal; said multiplier assembly having a multiplier whose output voltage corresponds to the incremental transmission losses ($N_{vi}$), said latter multiplier having two input circuits of which one is connected in series with one of said feeder points of said network and the other is connected between said feeder point and said end terminal of said resistor.

References Cited in the file of this patent
UNITED STATES PATENTS
2,829,829  Starr et al. _____ Apr. 8, 1958